US008412708B2

(12) United States Patent
Shevitz

(10) Patent No.: US 8,412,708 B2
(45) Date of Patent: Apr. 2, 2013

(54) SYSTEM AND METHOD FOR MODELING AND ANALYZING COMPLEX SCENARIOS

(75) Inventor: Daniel Wolf Shevitz, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 602 days.

(21) Appl. No.: 12/561,729

(22) Filed: Sep. 17, 2009

(65) Prior Publication Data

US 2011/0066621 A1     Mar. 17, 2011

(51) Int. Cl.
*G06F 17/30* (2006.01)
(52) U.S. Cl. ......... 707/736; 707/797; 707/803; 707/804
(58) Field of Classification Search .................. 707/736, 707/797, 803, 804
See application file for complete search history.

(56) References Cited

U.S. PATENT DOCUMENTS

| 6,662,189 B2 * | 12/2003 | Oyanagi et al. ...................... 1/1 |
| 2010/0223211 A1 * | 9/2010 | Johnson et al. ................. 706/11 |

OTHER PUBLICATIONS

Eisenhawer et al., "Assessing the Risk of Nuclear Terrorism Using Logic Evolved Decision Analysis", American Nuclear Society Annual Meeting, pp. 1-8, Jun. 1-4, 2003, San Diego, CA,[retrieved on Apr. 8, 2012]. Retrieved from Internet :<URL: http://logicevolved.homestead.com/LET0029.pdf>.*

* cited by examiner

*Primary Examiner* — John E Breene
*Assistant Examiner* — Dennis Myint
(74) *Attorney, Agent, or Firm* — Husch Blackwell LLP; Samuel Digirolamo

(57) ABSTRACT

An embodiment of the present invention includes a method for analyzing and solving possibility tree. A possibility tree having a plurality of programmable nodes is constructed and solved with a solver module executed by a processor element. The solver module executes the programming of said nodes, and tracks the state of at least a variable through a branch. When a variable of said branch is out of tolerance with a parameter, the solver disables remaining nodes of the branch and marks the branch as an invalid solution. The valid solutions are then aggregated and displayed as valid tree solutions.

3 Claims, 13 Drawing Sheets

State Dictionary
Available Money = 3.75
Allergy = 'Banana'
Souvenir Cup = 'In Stock'

State Dictionary
Available Money = 3.75
Allergy = 'Banana'
Souvenir Cup - 'In Stock'
Size = 'medium'
Cost = 3.00

State Dictionary
Available Money = 3.75
Allergy = 'Banana'
Souvenir Cup - 'In Stock'
Size = 'medium'
Cost = 3.00
Flavor = 'strawberry'

State Dictionary
Available Money = 3.75
Allergy = 'Banana'
Souvenir Cup - 'In Stock'
Size = 'medium'
Cost = 4.00
Flavor = 'strawberry'
Supplement = 'protein'

SYSTEM AND METHOD FOR MODELING AND ANALYZING COMPLEX SCENARIOS

STATEMENT REGARDING FEDERALLY SPONSORED RESEARCH OR DEVELOPMENT

This invention was made with government support under Contract No. DE-AC52-06NA25396 awarded by the U.S. Department of Energy. The government has certain rights in the invention.

BACKGROUND OF INVENTION

1. Field of Invention

The present invention relates to methods and systems for modeling and analyzing solutions to complex scenarios. More specifically, the present invention relates to a method and system for modeling complex scenarios by creating modifiable programmable Possibility Trees.

2. Background Art

"Possibility Trees" are tools which help to condense many possible outcomes of a given situation into a more compact form. A Possibility Tree is comprised of nodes, each of which contains some piece or pieces of information. The nodes themselves are generally logic gates which help to determine how various such pieces of information are combined and ordered to provide possible solutions to the tree. In this way, a Possibility Tree with several thousand nodes may have billions and billions of solutions. Such a network of nodes or logic gates can be implemented using a computing device having software executing thereon and said software having logical gate functions operating in a possibility tree structure. Alternatively, the nodes or logical gates can be implemented in hardware using electronic logic gates imbedded in an integrated circuit design.

For example, a Possibility Tree may represent the possible choices for buying a flavored beverage such as a smoothie. The first node of the tree could contain the three possible sizes, such as, for example, small, medium and large. A large smoothie may have two possibilities, such as a souvenir cup or a standard large. The second node of the tree could contain the three possible flavors, such as for example strawberry, blueberry and banana. The last node of the tree could contain the choice of whether to add a protein supplement or not. Typically, nodes are selected such that each possible solution includes one choice from each of the nodes. As a result of these smoothie options given above, 24 possible solutions exist (the four size options, including the two large options, multiplied by the three flavors multiplied by the two options for protein supplement), where each solution represents a distinct "path" through or "branch" of the Possibility Tree.

Currently, in order to analyze such a Possibility Trees, the tree must be executed to list each possible path through the tree. In the above example, the solutions would be as follows: 1) banana, small, protein; 2) banana, small, no protein; 3) banana, medium, protein; 4) banana, medium, no protein; 5) banana, large, protein; 6) banana, large, no protein; 7) banana, large, souvenir cup, protein; 8) banana, large, souvenir cup, no protein; 9) strawberry, small, protein; 10) strawberry, small, no protein; 11) strawberry, medium, protein; 12) strawberry, medium, no protein; 13) strawberry, large, protein; 14) strawberry, large, no protein; 15) strawberry, large, souvenir cup, protein; 16) strawberry, large, souvenir cup, no protein; 17) blueberry, small, protein; 18) blueberry, small, no protein; 19) blueberry, medium, protein; 20) blueberry, medium, no protein; 21) blueberry, large, protein; 22) blueberry, large, no protein; 23) blueberry, large, souvenir cup, protein; and 24) blueberry, large, souvenir cup, no protein. As can be seen, each of these solutions is also representative of the path taken: flavor→size→supplement.

In prior art systems, each node is merely a logic gate, capable only of defining how the possible options (or "options") which it contains are combined and ordered to provide possible solutions to the tree. This leaves an analyst to determine whether each "solution" is viable. In the above smoothie example, whether such solutions are viable depends on parameters such as, for example, cost versus available funds, common fruit allergy, etc. Essentially, in prior art systems, a person must analyze each possible solution according to chosen parameters to locate any inconsistencies in a possible solution. In the above smoothie example, for example, it may be known that a small costs $2.50, a medium costs $3.00, a large costs $3.50, a large souvenir cup costs $3.75, blueberry costs an additional $0.50, and a protein supplement costs an additional $1.00. In this example, an analyst would be required to calculate the total cost of each solution, and compare this total cost to the available funds of a consumer. Other parameters may be taken into account, such as an allergy to bananas in the above example, in which any solution which contains banana as the flavor is excluded, or the availability of souvenir cups.

As can be seen, where such a Possibility Tree has tens of thousands of nodes and billions of solutions, the analysis required becomes practically impossible. Indeed, such Possibility Trees are often used in connection with analysis of terrorist actions, where options and additionally known information may include suspected (or known) terrorists, terrorist organizations, locations, motivations, access to materials, access to funds, possible targets, etc. Each of these may include dozens of possible options and may be arranged in many of different ways, resulting in the possibility of billions of solutions. As can be seen, the mere change or addition of a single parameter or option would require a complete re-execution of the entire tree, and/or a completely new analysis of all of the possible solutions. When dealing with terrorist plots, slowly combing through tens of millions of possible solutions is ineffective and largely useless. Thus, an improved method of quickly executing Possibility Trees and analyzing solutions is desirable. Also, an improved method of quickly running and analyzing solutions of a sequence or plurality of Possibility Trees, each with slightly different parameters or options, is desirable.

BRIEF SUMMARY OF THE INVENTION

One or more of the embodiments of the present invention provide for a system and method for modeling and analyzing possible solutions to complex scenarios using Possibility Trees. In a preferred embodiment, a Possibility Tree is constructed with nodes, at least one of which is a logic gate node, and some and preferably all of which are programmable nodes. The construction of a Possibility Tree may be accomplished through hardware, such as with programmable logic arrays, or through software. Logic gate nodes can be populated with respective choices or options, with some and preferably all of the programmable nodes being programmed to access a database to import values for variables/parameters from the database upon execution of the node. An option may be comprised of an option alone, such as a smoothie size in the example above, or may be an option combined along with corresponding data, such as a smoothie size and its corresponding cost. Scenario parameters are then created and programmed into the Possibility Tree. Such population may be done manually, but preferably a node or series of nodes are each programmed to access a database containing parameters, and to import a parameter or set of parameters from the database into the node.

Once the Possibility Tree has been created and the nodes have been populated, a solver module executed by a processor element solves the tree. It is again noted that the population of such options and parameters may occur through database lookups which direct the solver module to import at least a variable value from a database during the execution of the tree. For each branch of the tree, a path state dictionary of un-typed variables specific to that path is tracked along that path such that any programmable node on that path may create and add a variable to the path state dictionary or may modify the state of an existing variable in the path state dictionary. Using the above smoothie example, when the "size" node is reached, the node would create a variable called "size," set it equal to "small" (or "medium" or "large", depending on the branch), and create (or modify) a "cost" variable and set it equal to the cost of the appropriate size (or add the cost of the appropriate size to any existing cost). As another example, where a large smoothie is the selected option, a souvenir cup may be used. A node could then check to see if souvenir cups are in stock, and where they are, a new variable called "souvenir" is created and its state is set to "yes." However, where the souvenir cup is not selected such that a standard "large" is used, the variable "souvenir" would not be created at all, and would therefore not exist in the branch. As can be seen, different variables can be created based on the selected options. Additionally, as the variables do not require that a variable type be specified (i.e., they are un-typed), the format of the options, such as those imported from a database, is irrelevant to the path state dictionary. This allows for flexibility both in terms of general variable types, such as strings versus integers versus floating point numbers, as well as the types of programs from which data can be imported.

At least one programmable node in a branch, and preferably several strategically placed programmable nodes, and more preferably all of the programmable nodes, are programmed to compare at least a variable in the path state dictionary to the scenario parameters, such as whether souvenir cups are in stock in the above smoothie example. During the execution of a tree, such a programmable node preferably uses at least one variable from the path state dictionary as an input to determine whether the current branch solution (or a part of the current branch solution) is out of tolerance with some scenario parameter or meets other arbitrary user defined conditions. Where the node determines that the current branch meets (or does not meet) such user defined conditions, it disables the remaining nodes of the branch and marks the current branch solution as an invalid solution, "dynamically pruning" the current branch. Upon reaching the conclusion of a path, the tree, solution, and path state dictionary would then be rolled back to the last OR gate node with an unused option, and the execution of the tree would continue. The ability to halt and exclude branches mid-path reduces the time and computing power necessary to fully execute a Possibility Tree, and eliminates the burden on an analyst to determine which branches are invalid. Once the branches of the Possibility Tree have each been executed and those branches with invalid solutions have been dynamically pruned from the tree, the remaining valid branches are aggregated and outputted as viable solutions to the Tree.

Programmable nodes may also be programmed to dynamically alter the options or parameters it contains. For example, in the above smoothie example, it may be determined that the protein supplement has a bad taste when used with banana smoothies. Therefore, the protein supplement node may be programmed to automatically exclude the protein supplement option (and its associated cost data) from any branch in which banana is the selected flavor. Additionally, it may be determined that strawberry is so well liked as a flavor that people are willing to pay for a larger strawberry smoothie than they would normally be willing to buy. Therefore, the available funds parameter may be automatically changed when strawberry is selected as a flavor. Once the programmable nodes have been programmed and the options and parameters loaded, the Possibility Tree would then be executed as above.

One embodiment of the present invention includes constructing a possibility tree which has a plurality of nodes, wherein at least one such node is programmable, and populating the at least a programmable node with at least a variable. At least a said programmable node is then programmed with instructions for utilizing said at least a variable during the execution of the possibility tree. It is noted that the populating step may include programming a programmable node with database lookups. The possibility tree is then solved by a solver module executed by a processor element. Where the database lookups have been included with the programming, a database is accessed and the appropriate variable is imported according to the database lookups. Such solving includes tracking a path state dictionary of variables specific to a path of the possibility tree along the path, where a said programmable node is operable to create and add a variable to said path state dictionary, and is operable to modify the state of an existing said variable in said path state dictionary. The solver module then compares at least a said variable to a user defined condition as instructed within the programming of a said programmable node. When a said variable of said path meets a user defined condition, the solver module disables any remaining nodes of said path and marks the path as an invalid solution. Upon reaching the conclusion of a path, the possibility tree, including the path state dictionary, is rolled back to its state as of the last OR gate node in the concluded path with an unused option, allowing the execution of said possibility tree to continue with the selection of the unused option. The tracking, comparing and disabling steps are then repeated for a plurality of paths, and any completed paths are aggregated and displayed as valid tree solutions.

It is noted that the construction of the possibility tree includes creating and placing notes within the tree by creating a gate information module containing instructions for executing a node, said instructions including programming, and by creating at least on context information modules, where a context information module contains information defining the location within the possibility tree of a node. Where at least two context information modules are created and associated associating with a single gate information module, at least two replicant nodes. Another embodiment of the present invention includes constructing a possibility tree having a plurality of nodes, wherein at least one the nodes is programmable. The at least one programmable node is then populated with at least one variable, and is programmed with instructions for utilizing the at least one variable during the execution of the tree. The tree is then solved by a solver module which is executed by a processor element. Solving the tree includes tracking a path state dictionary of variables specific to a path of the possibility tree along such path, where such a programmable node is operable to create and add a variable to the path state dictionary, and is operable to modify the state of an existing variable in the path state dictionary. Solving a tree further includes comparing at least a variable to a user defined condition as instructed within the programming of a programmable node, and disabling remaining nodes of the a during the execution of that path and marking that path as an invalid solution when a variable of that path meets a user defined condition. The tracking, comparing and disabling steps are then repeated for a plurality of paths, and completed paths are aggregated and displayed as valid tree solutions.

BRIEF DESCRIPTION OF THE DRAWINGS

For a better understanding of the present invention, reference may be made to the accompanying drawings in which:

FIG. 13 is a block diagram showing various states of an exemplary path state dictionary.

DETAILED DESCRIPTION OF THE INVENTION

Figure 1:
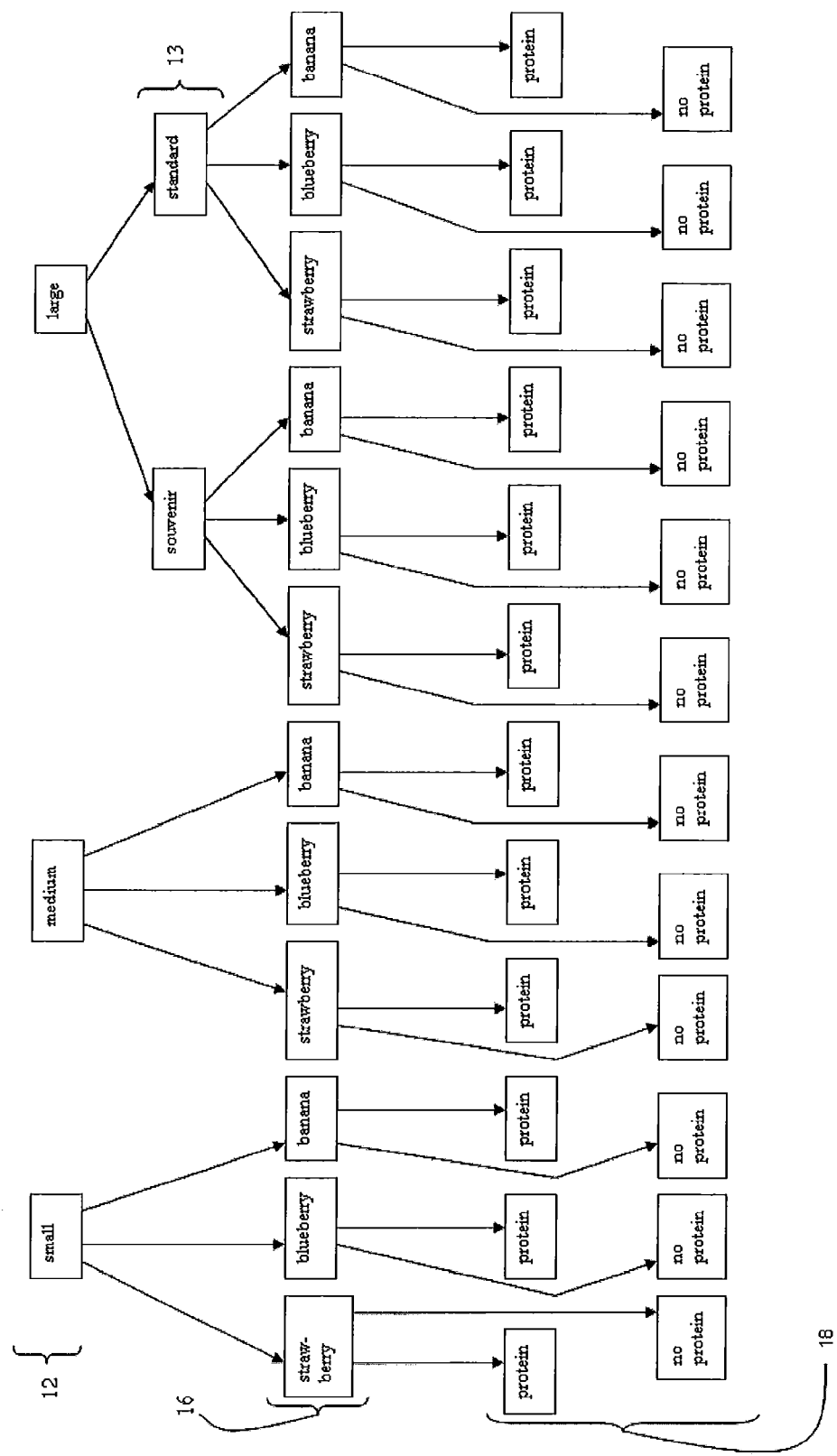
FIG. 1 is a fully expanded Prior Art Possibility Tree.

FIG. 1 illustrates a Prior Art Possibility Tree 1, in which the above mentioned smoothie example is fully diagrammed. This example is utilized for illustration purposes only, and should in no way be seen as limiting. Prior Art Possibility Tree 1 contains three levels 12, 16, 18 representative of the three nodes discussed above—size 12, flavor 16, and protein supplement 18. The size row 12 additionally contains a sub-row for the souvenir cup option 13 under the "large" option. Of course, the tree could be represented in a much more compact form by using an OR gate to condense each row, and by combining each of the rows with an AND gate. However, the number of branches and solutions would remain the same.

To analyze such a Possibility Tree 1, each branch must be individually executed in full, with each possible solution (valid and invalid alike) being compiled for later analysis. The example shown in FIG. 1 is representative of only a few nodes with several possible choice alternatives. As can be seen, these few nodes and options result in twenty four possible solutions. For a smoothie Possibility Tree in which there are thirty different flavors, five different sizes, six different supplements, and in which up to three flavors can be mixed, the number of possible solutions rises to 730,800. These nearly three quarters of a million possible solutions stem from a tree with only several nodes. A tree which contains several thousands of nodes may therefore have possible solutions which number in the billions of billions, each of which must then be analyzed by hand to determine which of the potentially billions of solutions are invalid based on known parameters. Such a tree would be impossible to execute and analyze in a single lifetime. Further, changing even a single choice alternative or parameter requires a complete writing and re-execution of the entire Possibility Tree.

An embodiment of the present invention relates to a system and method for executing and analyzing Possibility Trees using programmable nodes which are programmable to disable the remaining nodes of a given branch and mark the branch as an invalid solution. Programmable nodes are also capable of database queries possibly including geospatial queries, external shell processes such as finite element simulations or other programs designed to return values given input data, acquiring information from other persistent shell processes such as Bayesian network analysis software, web queries, etc. These programmable nodes are programmable to utilize variables from a path state dictionary which track the state of the current branch and its solution to analyze whether the branch solution falls within acceptable parameters. Where a node determines that the current branch solution or part of the current branch solution is not within acceptable parameters or meets other arbitrary user specified conditions, that node deactivates the remaining nodes of the branch, marking the branch as an invalid solution and signals for a rollback of the tree to the last node with remaining option, as will be described in detail below. The execution of the remaining branches of the Possibility Tree then continues.

As another, alternate example from the smoothie example described above and below, a Possibility Tree may be constructed to evaluate the risks associated with various individuals and organizations suspected of having terrorist ties. In such an example, the parameters may relate to the circumstances necessary to pose a risk to more than 100 people at a time, such as checking for people or organizations with access to materials which would cause a large enough explosion in combination with people or organizations with access to know ledge necessary to assemble a bomb of sufficient size. Nodes and options may include individuals, organizations, locations, materials/resources. Where it is determined that a path's combination of options would possess insufficient materials, knowledge, motives, time, resources, money or any other relevant parameter to pose a threat, the branch would be marked as invalid and the remaining nodes would be disabled. From such an example, it can be seen how the discovery of new information may be found long after a tree is constructed, and the tree may need to be quickly modified in view of the new data. The programmable nature of the nodes allows for fast modification of the tree, and may result in there being no need for structural changes due to the ability to modify queried values in a database.

Figure 2:
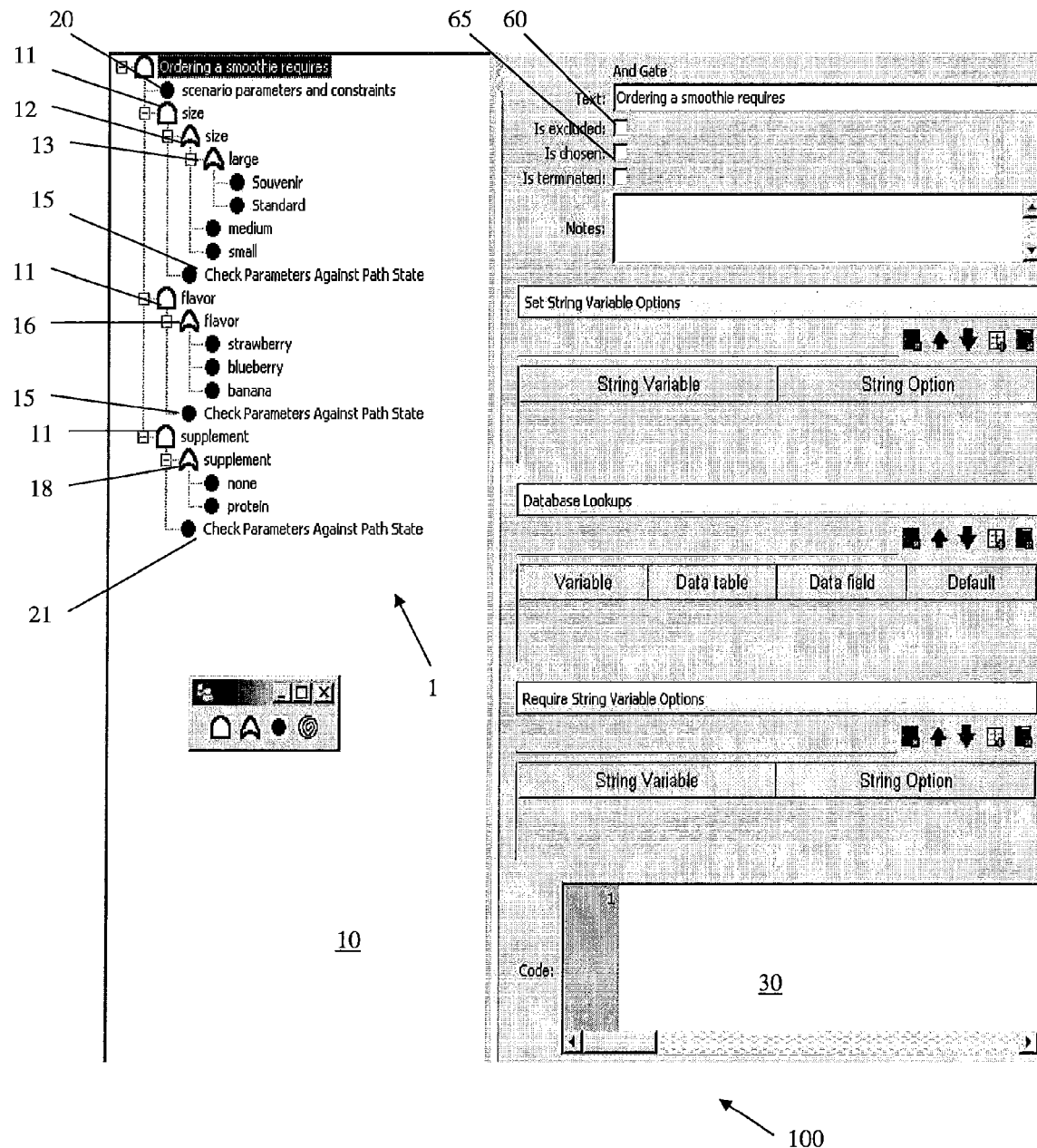
FIG. 2 is a screen shot of an exemplary Possibility Tree interface including an exemplary Possibility Tree.

By way of example, FIGS. 2-8 illustrate screen shots of an exemplary Possibility Tree interface 100 running the above discussed simple smoothie Possibility Tree example according to an embodiment of the present invention. As shown in FIG. 2, Possibility Tree 1 is displayed in tree frame 10, and contains three AND gate nodes 11 under the root AND gate, each of which contain an OR gate nodes 12, 16 and 18 and a computational "terminal" node 15, 21. OR gate nodes 12, 13, 16 and 18 contain terminal option nodes 13, 14, 17 and 19. In the smoothie example illustrated in FIGS. 2-8, each of the nodes is programmable to utilize a variable during the execution of the tree, though it is noted that not every node in a given Possibility Tree need be programmable. FIGS. 3-8 show exemplary code segments associated with various nodes and option, as displayed in code frame 30 in each Figure. It is noted that a node, possibly including any descendent nodes but preferably the node itself, may be explicitly excluded or chosen during the execution of a Possibility Tree, as is shown by exclude box 60 and chosen box 65 in FIG. 2. For example, where the "small" choice is "chosen" with chosen box 65, the other "size" choices would be ignored during the execution of the tree.

Figure 3:
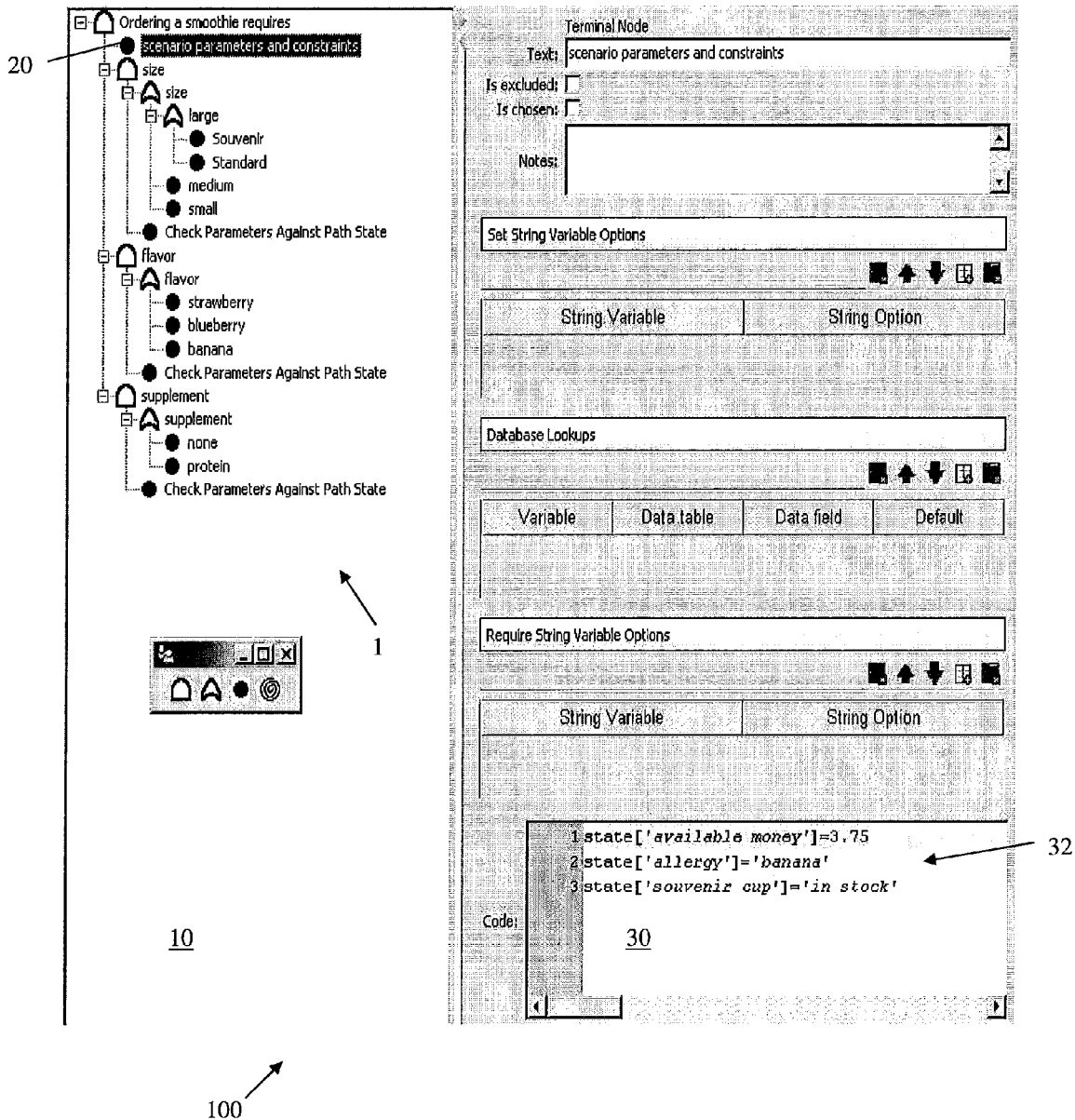
FIG. 3 is a screen shot of an exemplary Possibility Tree interface in which the coding of a terminal "Parameters" node is displayed.

In a preferred embodiment of the present invention, variables in a given branch are tracked as part of a "path state dictionary" in order for each node to analyze the current state of the current path. The path state dictionary is specific to the current branch of the tree. Exemplary variables and their "states" are shown in FIGS. 3-8. As shown in FIG. 3, computational parameters node 20 is preferably positioned at the beginning of the tree. Since it is preferable to direct programmable nodes throughout a branch to determine whether a branch solution is within tree parameters, it is therefore preferable to create and set the state of parameter variables in the path state dictionary prior to the programmable nodes which will use the parameter variables.

Programmable nodes, which have access to the path state dictionary, are therefore able to determine whether a branch solution does or does not meet certain user defined conditions for such parameters or other criteria. During the execution of a branch, upon reaching a programmable node, the programmable node may be programmed to compare the current state of at least one variable to the current state of the parameters or may execute some other user defined programming to determine whether the branch should continue. Where the branch solution, whether a complete or partial solution, falls outside the required parameters, or where other user defined programming requires as such, the programmable node is able to mark the branch solution as invalid, thereby effectively deactivating any remaining nodes and advancing the execution of the tree to the next path/branch/solution. The path state dictionary and position in the branch are then rolled back to the last OR gate node with at least one remaining option and the execution of the tree continues. This method of "dynamically pruning" a Possibility Tree is capable of saving significant execution time and effort, and greatly reduces the onus put on analysts by removing invalid branch solutions.

It is noted that scenario parameters themselves may be modified or created by any programmable node. For example, using the smoothing example, where it is determined that customers are willing to pay more than $3.75 for smoothies that contain blueberry, a programmable node may increase the "available money" variable to a higher value for the purposes of any branch in which "blueberry" is selected.

Exemplary parameters for the above discussed smoothie example are illustrated in FIG. 3 by scenario parameters and constraints node 20. As shown in FIG. 3, the parameters and their states are programmed directly into the tree. However, it should be understood that manually programming such parameters directly into the tree would be difficult for a tree with thousands of nodes. Therefore, parameters, options and other variables are preferably stored in databases external to the Possibility Tree, and database queries are programmed into the programmable nodes of the Possibility Tree to populate the various variables and/or their states. The use of external databases decreases the time necessary to input new or different variable states as the coding of the tree need not be substantially modified, with only a simple database entry or database query parameters requiring modification. Additionally, for the purposes of this example, it is assumed that the maximum amount of money that a customer will be willing to pay is $3.75, while banana smoothies may lead to allergic reactions in connection with protein supplements. As shown in parameter code 32, the computational parameters node 20 creates a variable called "available money" in the path state dictionary and sets its state to $3.75, while creating a variable called "allergy" in the path state dictionary and setting its state to "banana", and creating a variable called "souvenir cup" and setting its value to "in stock". It is noted that no variables called "allergy", "available money" or "souvenir cup" existed in the path state dictionary or in the programming of the Possibility Tree 1 prior to the code shown in code frame 30 in FIG. 3. It is also noted that there is no typing required when the variables are created and their states set—created variables may be assigned strings, integers, floating point numbers or any other data type. The lack of a need to preset variable types allows significant flexibility for the above discussed database lookups, as virtually any type of database and database management may be utilized.

Indeed, the path state dictionary allows a user to program a node to add and/or manipulate new variables at any point in a Possibility Tree without previous variable initialization or typing. To add a new and unanticipated variable to the path state dictionary at any point along a branch, a node need only name the variable and give it a current state, such as naming a variable "available money" and setting this variable equal to 3.75 as shown in FIG. 3. A database query could also be used to assign a variable its state. Thus, when building or analyzing a Possibility Tree, where it is discovered that a new node needs to be added or a new parameter is discovered, the Possibility Tree and its solutions may be altered without significant reprogramming. A user need only add code to the appropriate node (or options) to define the state of the variable at its initial use in the highest node in which it is used, and then insert any code in subsequent nodes (or options) needed to track the variable. In this way, users need not sort through complex recursion-heavy program code.

Additionally, as seen with parameters terminal node 20 shown in FIG. 3, nodes may serve functions aside from logic gate functions. This would have been impossible with prior art Possibility Trees, as there was no function served by nodes other than logic gate functions. In this embodiment of the present invention, however, the code contained in the parameters terminal node 20 is executed once this node is reached, regardless of the branch leading to it.

Programmable nodes, which have access to the path state dictionary, are therefore able to determine whether a branch solution meets user defined conditions preferably related to the selected parameters. During the execution of a branch, upon reaching a programmable node, the programmable node may be programmed to compare the current state of at least one variable to the state of the parameters at that point in that branch to determine whether the branch should continue. It is noted that a user may program any desired conditions into a programmable node, and need not be limited to any specific parameters or variables. However, preferably such conditions would relate to a branch solution and/or variables/parameters of the branch. Where the branch solution, whether a complete or partial solution, or other criteria do not meet the user defined conditions, the programmable node is able to mark the branch solution as invalid as described below, thereby effectively deactivating any remaining nodes and advancing the execution of the tree to the next branch/path/solution. The path state dictionary and position in the branch are then preferably rolled back to the last OR gate node with at least one remaining option and the execution of the tree continues. This method of "dynamically pruning" a Possibility Tree is capable of saving significant execution time and effort, and greatly reduces the onus put on analysts by removing invalid branch solutions.

Figure 4:
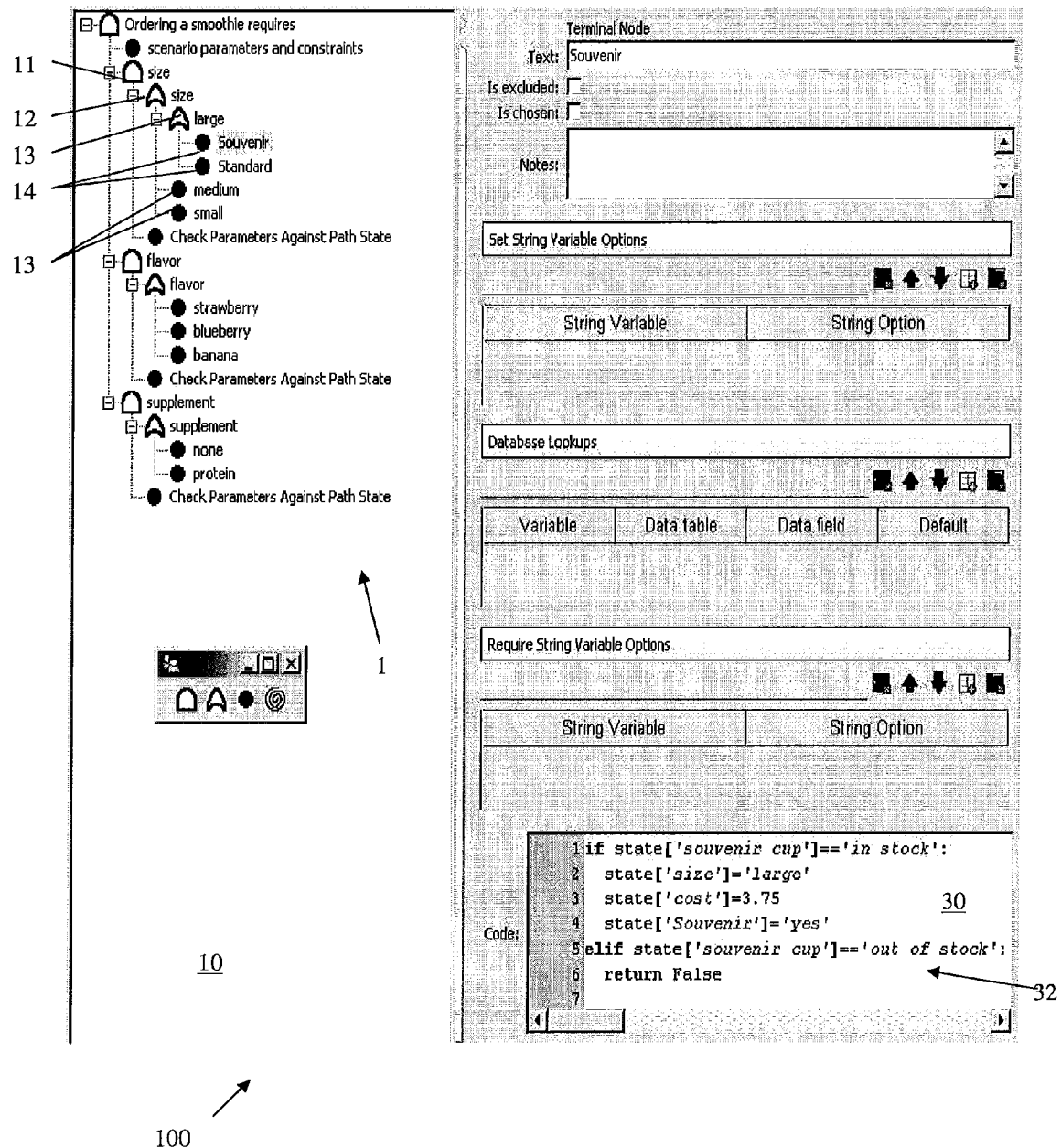
FIG. 4 is a screen shot of an exemplary Possibility Tree interface in which the coding of an option in a first node is displayed.

Logic gate nodes and the options they contain may also contain program code. For example, as shown in FIG. 4, the size node 12 contains three possible size options 13: large, medium and small. The "large" option 13 is, itself, a logic gate 13 with large sub-options 14: souvenir and standard. When a size option 13 and large sub-option 14 is selected, such as large→souvenir as shown in FIG. 4, code frame 30 displays the size code 32 associated with that size options or large sub-options 13, 14. In FIG. 4, the large→souvenir sub-option 14 is selected, and the programmable node performs a check of the "souvenir cup" parameter. Where this parameter has a value of "in stock", the "state" of new, un-typed variables called "size", "cost" and "Souvenir" are set to "large", 3.75 and "yes", respectively. It is noted that where either the "medium" or "small" options 13, or the large→standard sub-options 14 is selected, there is no souvenir cup needed, and therefore no check of the "souvenir cup" parameter is done and no "Souvenir" variable is created. The states of the variables created during a given branch, along with any parameter variables which have been created, are then tracked through that branch, and may be manipulated and/or utilized by subsequent programmable nodes.

Figure 5:
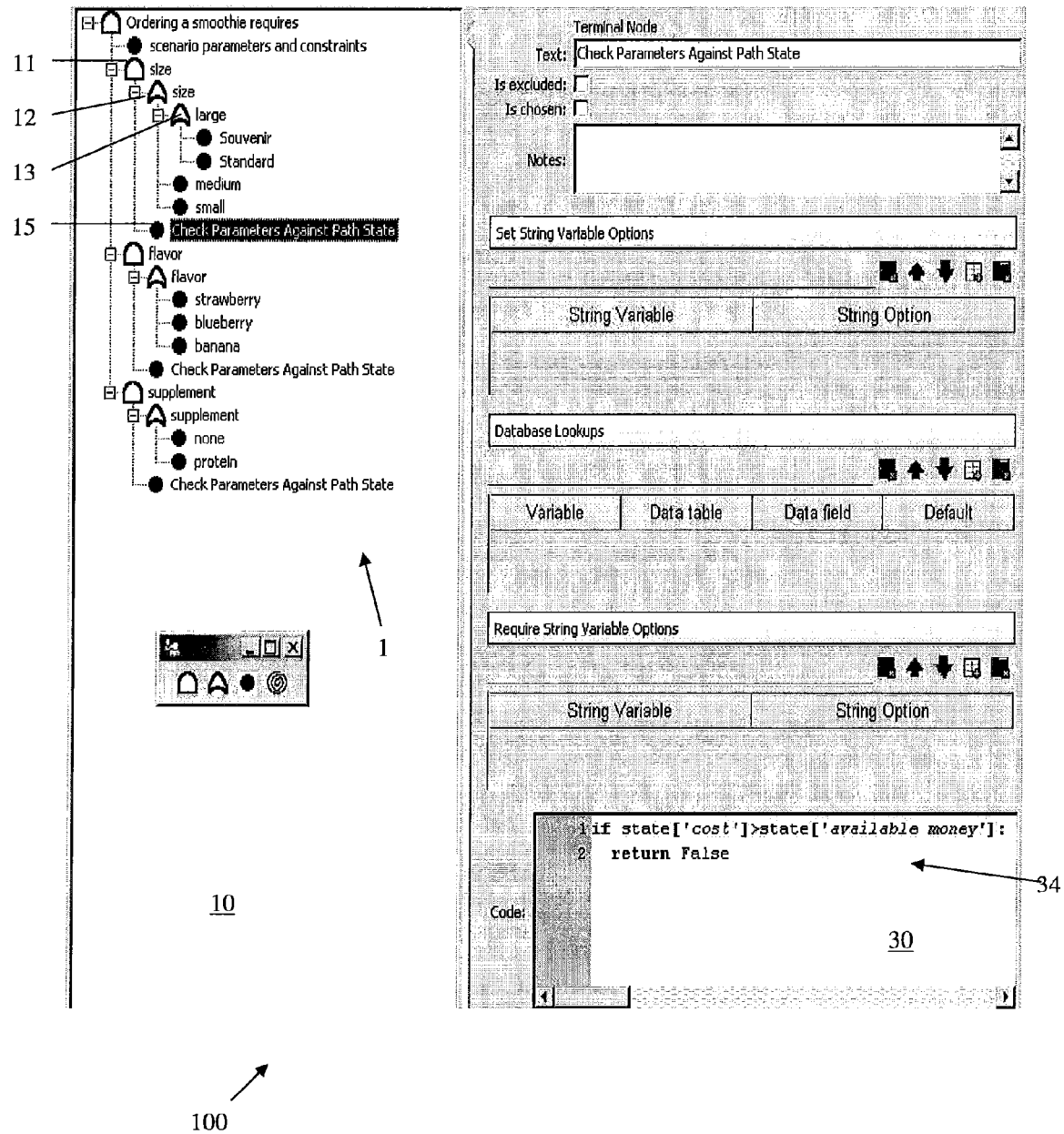
FIG. 5 is a screen shot of an exemplary Possibility Tree interface in which the coding of a terminal node for checking the validity of the branch solution is displayed.

For example, the Check Parameters Against Path State node 15, as shown in FIG. 5, compares the state of the "cost" variable after a "size" selection is made to the "available money" parameter variable with comparison code 34. Where the state of the "cost" variable exceeds the "available money", the branch is marked as invalid, effectively disabling the remaining nodes of the branch, thus dynamically pruning the tree. A similar function is performed under the large→souvenir sub-option 14 in FIG. 4. There, where the "souvenir cup" parameter does not equal "in stock", the branch is marked as invalid, disabling the remaining nodes of the branch. The Check Parameters node 15 is combined with the size OR gate 12 under an AND gate 11 so that the Check Parameters node 15 is executed no matter which "size" option/sub-option 13, 14 is selected. Alternatively, comparison code 34 may be added to each size options 13 and large sub-options 14 node, in which case AND gate 11 and the Check Parameters node 15 are unnecessary.

Figure 6:
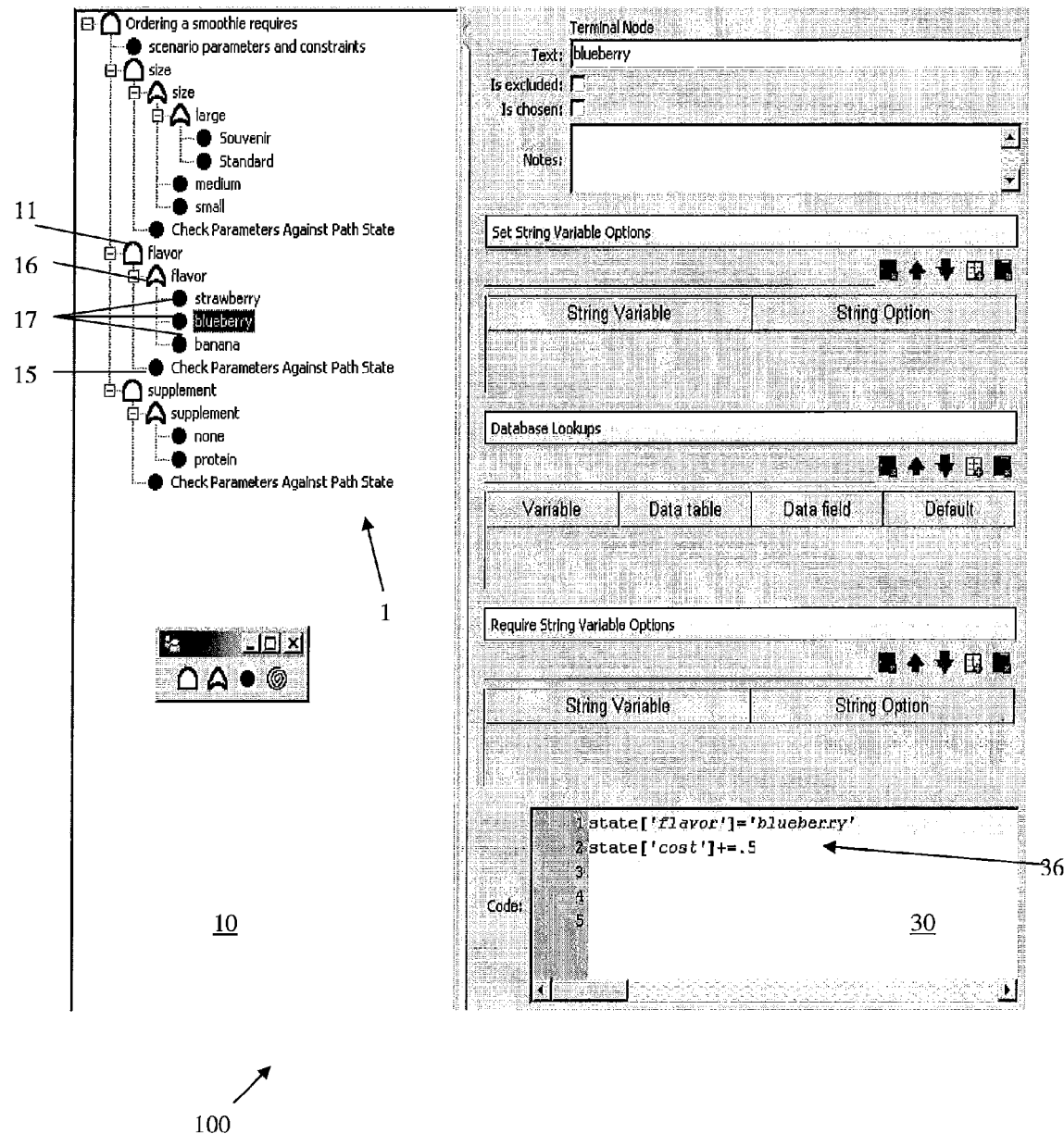
FIG. 6 is a screen shot of an exemplary Possibility Tree interface in which the coding of an option in a second node is displayed.
Figure 7:
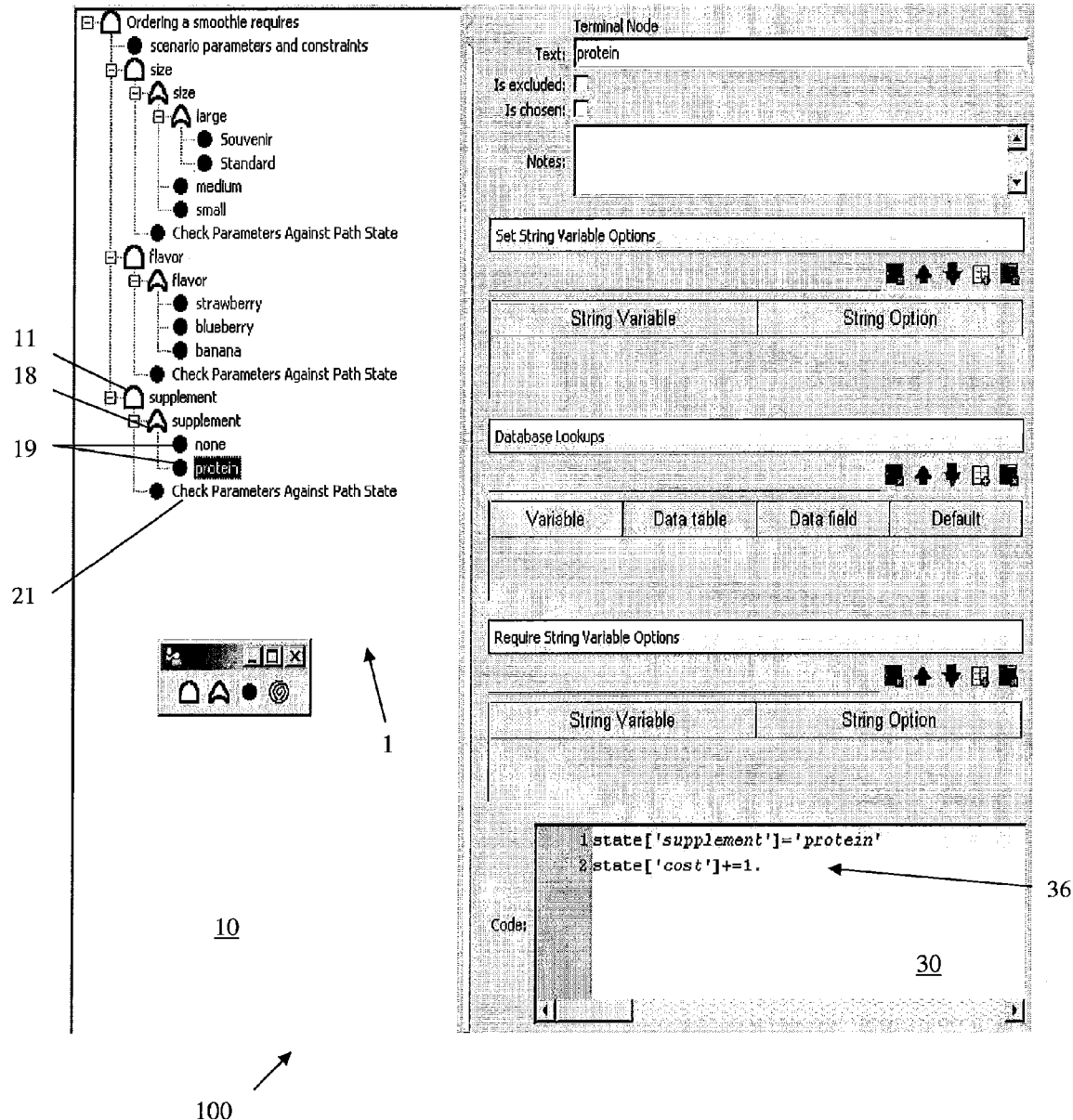
FIG. 7 is a screen shot of an exemplary Possibility Tree interface in which the coding of an option in a third node is displayed

As shown in FIGS. 6 and 7, programmable nodes are able not only to create variables and set their states in the path state dictionary, but they may also modify existing variables. In FIG. 6, when the "blueberry" flavor option 17 is selected, code frame 30 displays code 36 not only sets the "state" of a new, un-typed variable called "flavor" to "blueberry", but also adds fifty cents to the current state of the "cost" variable, regardless of current state of the "cost" variable as set by the size option/sub-option 13, 14 already selected. Similarly, in FIG. 7, when the "protein" supplement option 19 is selected, code frame 30 displays code 40 not only sets the "state" of a new, un-typed variable called "supplement" to "protein", but also adds $1 to the current state of the "cost" variable. It is noted that the flavor node 16 falls under an AND gate 11 in connection with a Check Parameters node 15 identical to that shown in FIG. 5 above. Thus, after a flavor option is selected, the state of the "cost" variable is again compared with the "available money" parameter variable, and as before, were the state of the "cost" variable exceeds the "available money", the branch is marked as invalid, effectively disabling the remaining nodes of the branch. The tree is then rolled back to the last node with at least one remaining option. For example, when, during the execution of smoothie Possibility Tree, the branch: large→blueberry is reached, the Check parameters node 15 determines that the cost is higher than the available money and all branches having a size of large and a flavor of blueberry are marked as invalid and excluded. The tree, including the options selections and the path state dictionary, then rolls back to its state before the execution of the last node with at least one remaining option. In the smoothie example, the last node with remaining unselected options is the flavor node 16, as the banana option has yet to be selected. Therefore, the selected option would roll back from large→blueberry to merely "large", while the path state dictionary would roll back from $4.00 to $3.50. The execution of the tree would then continue with the large→banana branches. Had the blueberry option 17 been the last option in the in the flavor node 16, the tree would have rolled back to the size node 12, and recommenced execution with the medium size option 13.

Nodes may also be replicants. A replicant is a copy of another "model" node, where the replicant is placed at least one other place in a Possibility Tree. In an embodiment of the present invention, when a model node is replicated during the construction of the tree, the model node and its replicants are all flagged in a similar manner such that a change to a single node of the class may propagate to all other nodes so flagged. The flagging of the model node and its replicants is preferably done automatically, and may occur through bits designed to be used as flags or any other way of so marking as is known in the art.

Alternatively, nodes may be defined by two groups of information: gate information and context information. Gate information may include the type of node, the children contexts, as well as any programming associated with the node. Context information may include the parent node (and hence the structure of the tree), as well as whether this particular instance of the node is excluded, chosen, and/or has been disabled. Context information may also include a pointer which points to the gate information to be associated with the node having that context information. Gate information between replicants necessarily remains the same since, by definition, the gate type and programming must be identical between replicants. Therefore as all replicants of a node utilize the same gate information data, only a single copy of the gate information need be stored. Indeed, when a replicant is created, new context information is stored which defines the replicant node's place in the tree, while pointing to the relevant shared gate information. Thus, each replicant has its own context information, which preferably includes a pointer which points to the shared gate information. When the gate information is altered at any replicant or the model node, the change automatically propagates to the other replicants, as they each share the same gate information.

Figure 8:
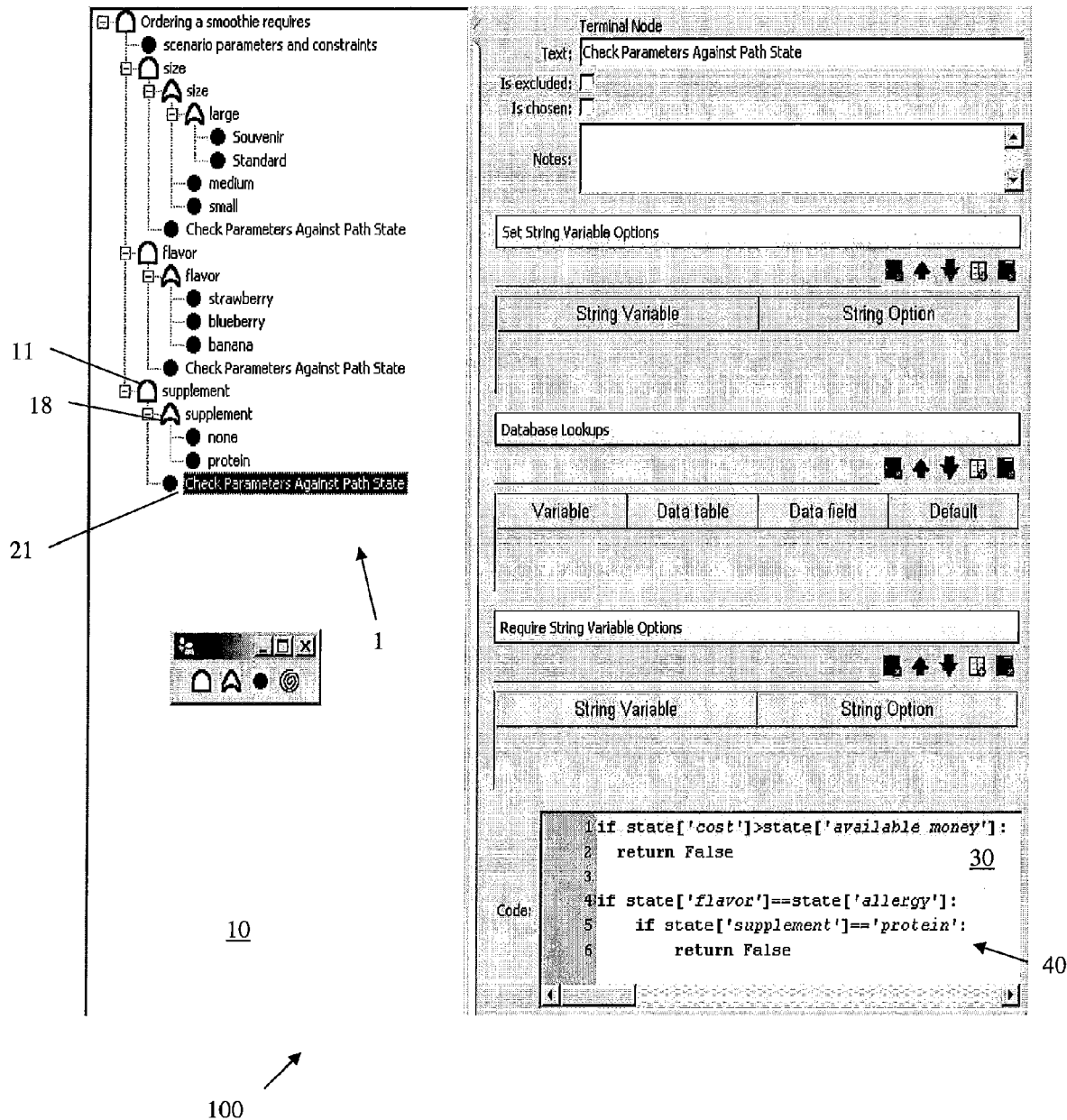
FIG. 8 is a screen shot of an exemplary Possibility Tree interface in which the coding of another terminal node for checking the validity of the branch solution is displayed.

FIG. 8 illustrates a different Check Parameters node 21, which not only checks the "available money" parameter, but also checks the state of the "allergy" variable with code 40—where the "flavor" variable is set to "banana" and the "supplement" variable is set to "protein", the branch is marked as "false", effectively disabling the remaining nodes of the branch.

As will be understood by one of ordinary skill in the art, whether to aggregate all of the computations into a single node or spread them out between the various nodes as discussed above may depend on the structure of the Possibility Tree itself.

The graphical user interface shown in FIGS. 2-8 is preferably written in the Python programming language, and as such is platform independent. Files may be saved in a XML or binary format, or any other suitable format. In a software implementation, the code is preferably written with a model view controller architecture that decouples the underlying tree from the graphical user interface, making the tree solvable in code such that batch processing of case studies is possible.

Figure 9:
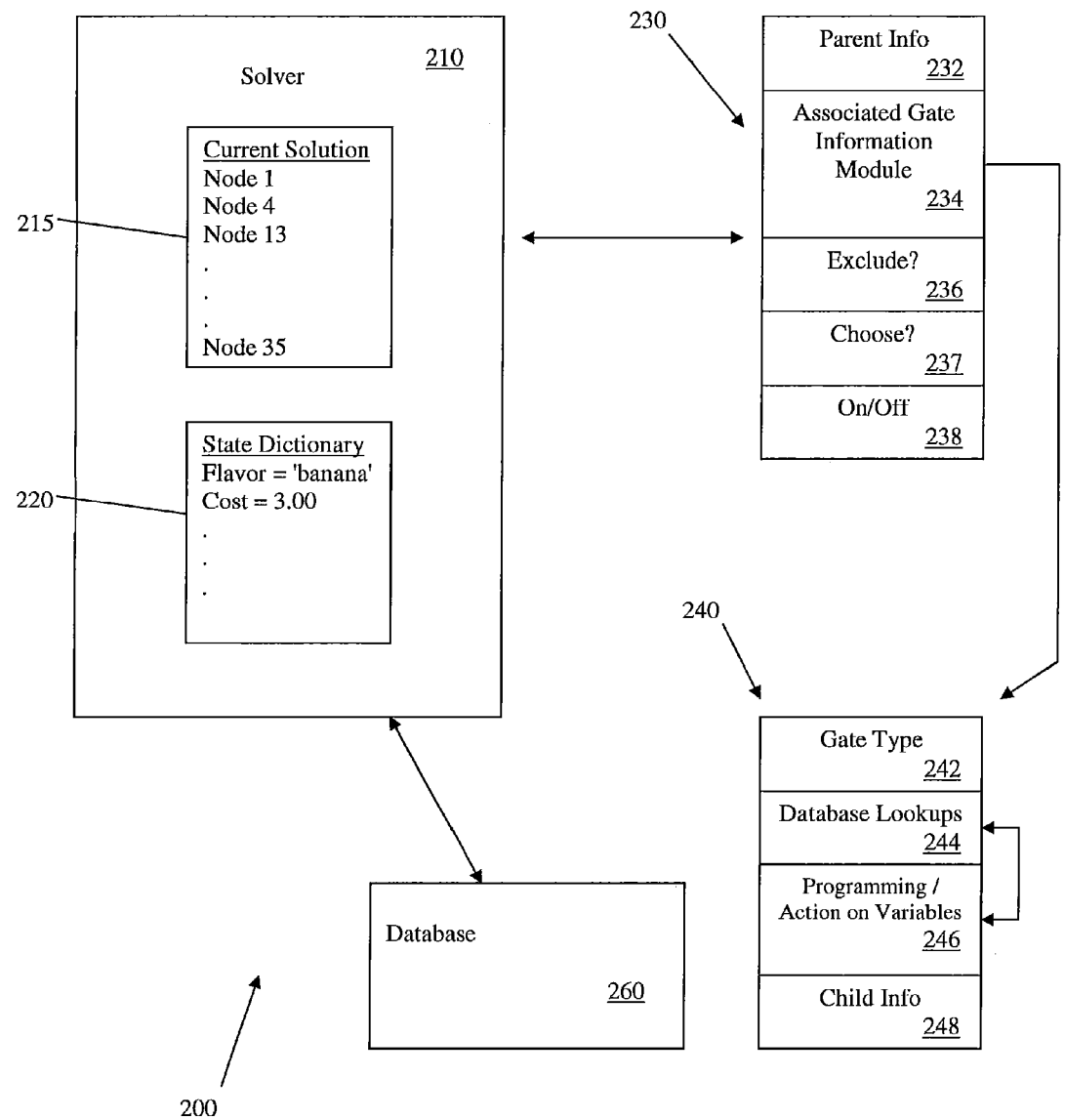
FIG. 9 is a block diagram of an embodiment of the present system.

FIG. 9 illustrates exemplary system architecture in a preferred embodiment of the present invention. The full system 200 includes a solver module 210, context info module 230, gate information module 240 and database 260. The solver module 210 executes the tree according to structure contained in the context information module 230 and the data and instructions contained in the gate information module 240. Solve module 210 includes a current solution list 215, which tracks the nodes of the current branch. Where the solver module 210 determines that the current branch is a viable solution, the current solution list 215 becomes a solution. Solver module 210 also stores and tracks the state dictionary 210, discussed above.

Solver module 210 interacts with context information modules 230 for the instructions and data regarding the structure of the tree and its contents. Preferably, data representing the context of the node is represented by a context information module 230 stored on any available type of storage medium, and preferably in an electronic memory. A context information module 230 contains information relating to the parent node 232. As each context information module 230 preferably contains information identifying the previous node (the parent node), much of the hierarchical structure of a tree is defined in the context information module 230. Preferably the context information module 230 contains associated gate information module 234 which alerts the solver module 210 as to which gate information module 240 is associated with that particular context information module 230. In this way, multiple context information modules 230 can utilize a single gate information module, allowing for replicants. Whether to exclude 236 or choose 237 the node and possibly its descendant nodes is also contained within a context information module 230. Additionally, information regarding whether the node has been turned off 238 is included with the context information module 230.

A gate information module 240 includes information regarding the gate type 242 of the node, such as AND, OR, or TERMINAL, providing the solver module 210 with information regarding the type of operation to perform in connection with subsequent nodes. Gate information module 240 also contains a list of database look-ups 244 for the node, which the solver module 210 utilizes to access the appropriate data in database 260. This data from the database 260 is utilized by the solver module 210 when it executes the programming 246 of the node. Depending on the programming 246 stored in the context information module 230, solver module 210 may modify or supplement the state dictionary 220. Solver module 210 may also turn the node and/or subsequent nodes off by editing the on/off information 250 for those nodes where it determines that the current solution 215 is invalid based on programming's 246 use of database look-ups 244 and those variables in state dictionary 220. Gate information module 240 also contains a list of any possible immediately subsequent nodes (the child nodes) 248, allowing the solver module 210 to follow the possible branches of a tree.

Figure 10:
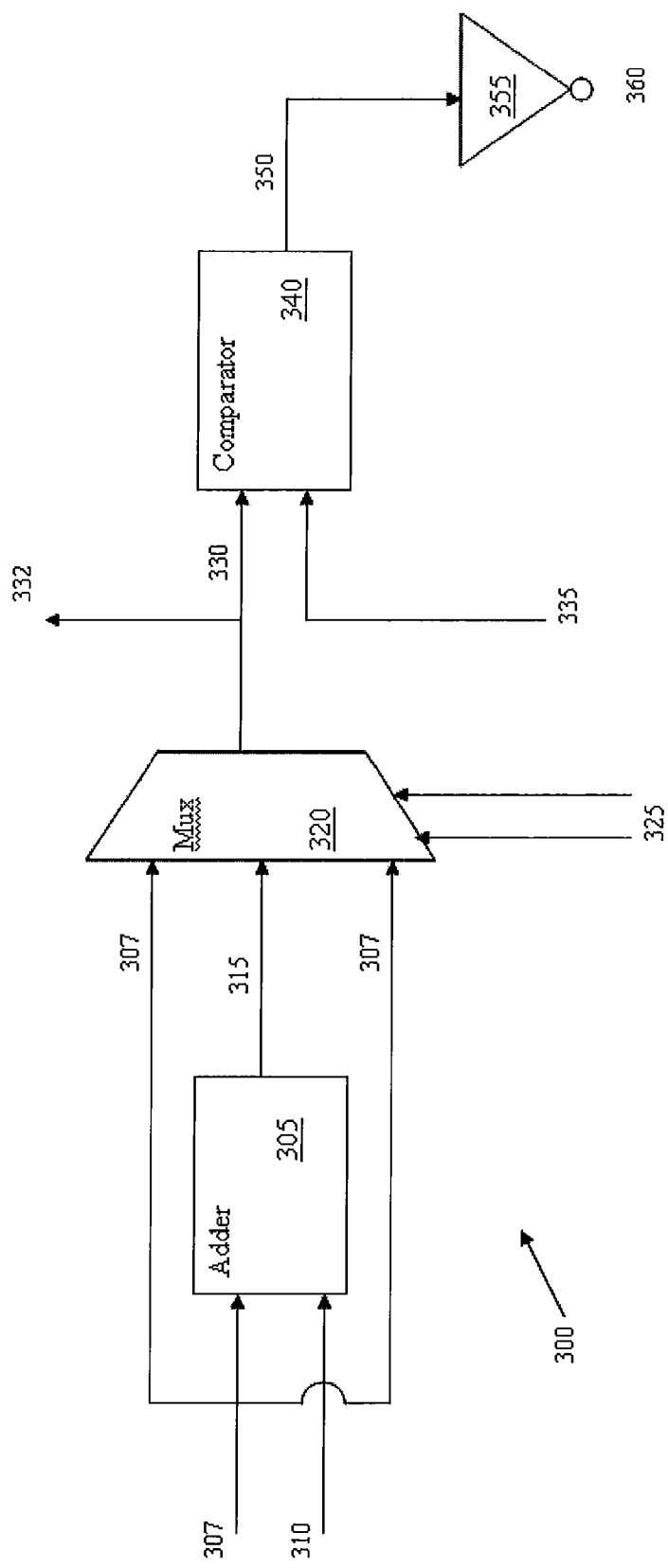
FIG. 10 is an exemplary schematic of a portion of an exemplary Possibility Tree as designed with hardware.

It is noted that hardware could easily be used to implement much or all of such a system. For example, as shown in FIG. 10, at least a portion of the flavor node 16 and its associated Check Parameters node 15 of FIG. 6 could be implemented in hardware with an adder 305, a multiplexer 320 and a comparator 340, and the necessary inputs. An inputs line or input lines from a register (not shown) containing the current state of the cost variable 307 and from a register (not shown) containing the added cost of blueberry flavor 310 are fed to an adder 305, which adder is of sufficient bits to adequately add the inputs 307, 310. The output bits 315 of the adder 305 gate are the second input bits to a multi-bit multiplexer 320. The first and third input bits are the current state of the cost variable 307. The selector inputs 325 are dependent on which flavor option was chosen—in this example, "strawberry" is "0 0", "blueberry is" "0 1", and "banana" is "1 0". As with the software tree described above, when "strawberry" or "banana" is the chosen option, the updated cost output 330 from the multiplexer 320 is the same as the cost 307 at the beginning of the node. However, where "blueberry" is selected, the updated cost output 330 is the cost at the beginning of the node 205 plus the additional cost of "blueberry" 310. Where "blueberry" is selected, the output from the multiplexer 320 may also be sent to update the cost register 332. Once the updated cost 330 is determined, it is sent to a multi-bit comparator 340 along with input lines from a register containing the current state of the "available money" variable. Where the updated cost 330 is larger than the available money, the appropriate output bit 350 of the comparator 340 is "true". An inverter 355 inverts this output to "false", and this bit is then fed to the remaining nodes of the branch as a flag to deactivate them, as will be discussed below. Where the inverted bit 360 is "true," the remaining nodes are not deactivated. Such hardware could be easily reconfigured to address situations in which additional costs are associated with other flavors, or in which other flavors are added as would be understood by one of ordinary skill in the art.

Figure 11:
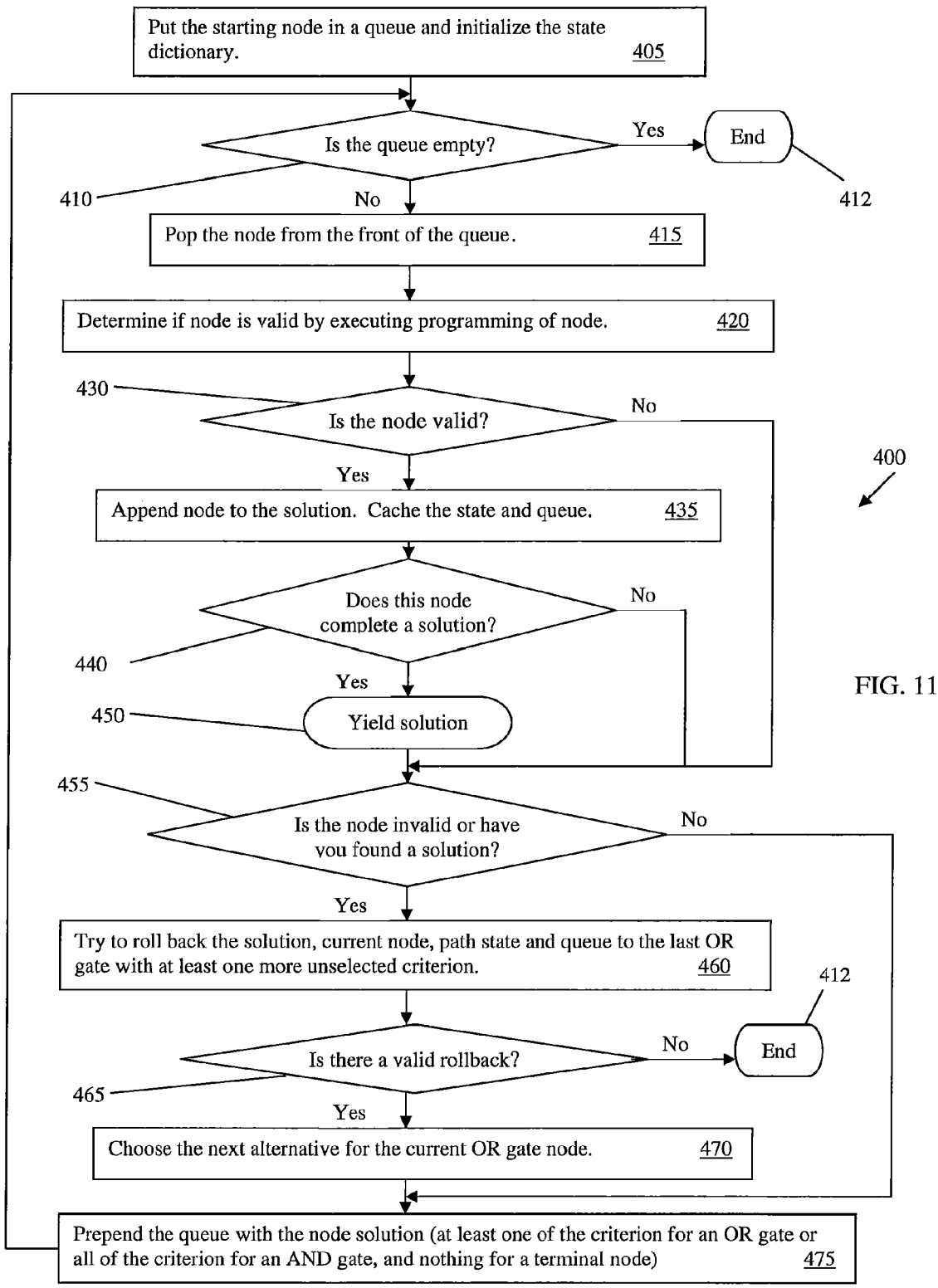
FIG. 11 is a flow chart of the method of executing a Possibility Tree with programmable nodes.

As shown in FIG. 11, for a processor element to run the process of executing a Possibility Tree 400 the process begins with step 405 of putting the starting node in a queue and initializing the state dictionary. At step 410, a check is made to determine whether the queue is empty. If so, the process ends at step 412. If the queue contains a node, a node is popped from the front of the queue at step 415. The processor element then determines if the node is valid by running any programming included in the node via method 420, explained in detail below. Where the node is invalid, the procedure advances to step 455, which will be discussed below.

However, where the node is determined to be valid after the programming is run, the node is appended to the solution and the state and queue are cached for any future rollback. Once a node has been appended to the solution, the processor element computes whether that node completes a solution at step 440. If the node does not complete a solution, the procedure advances to step 455, which will be discussed below. If the node completes a solution, the solution is yielded at step 450. Once the solution is yielded, (or if the node did not complete a solution at step 440, or if the node was not valid at step 430), another check is done to determine if the node was invalid or if there was a solution at step 455. Where the node was valid and there was no solution, the procedure advances to step 475, which will be discussed below.

However, where the node was invalid or a solution was found, the processor element attempts to roll back the solution, current node, path state and queue to the last OR gate with unselected options at step 460. If there was no valid rollback at step 465, the procedure ends at step 412. Where the rollback was valid at step 465 (or where the node was valid and there was no solution at step 455), the next option of the node to which the process rolled back is selected at step 470. At step 475, the queue is prepended with the current node solution. It is noted that this may be the selected option for an OR gate, the list of children for an AND gate, or nothing for a terminal node. The process then reverts back to step 410, discussed above.

Figure 12:
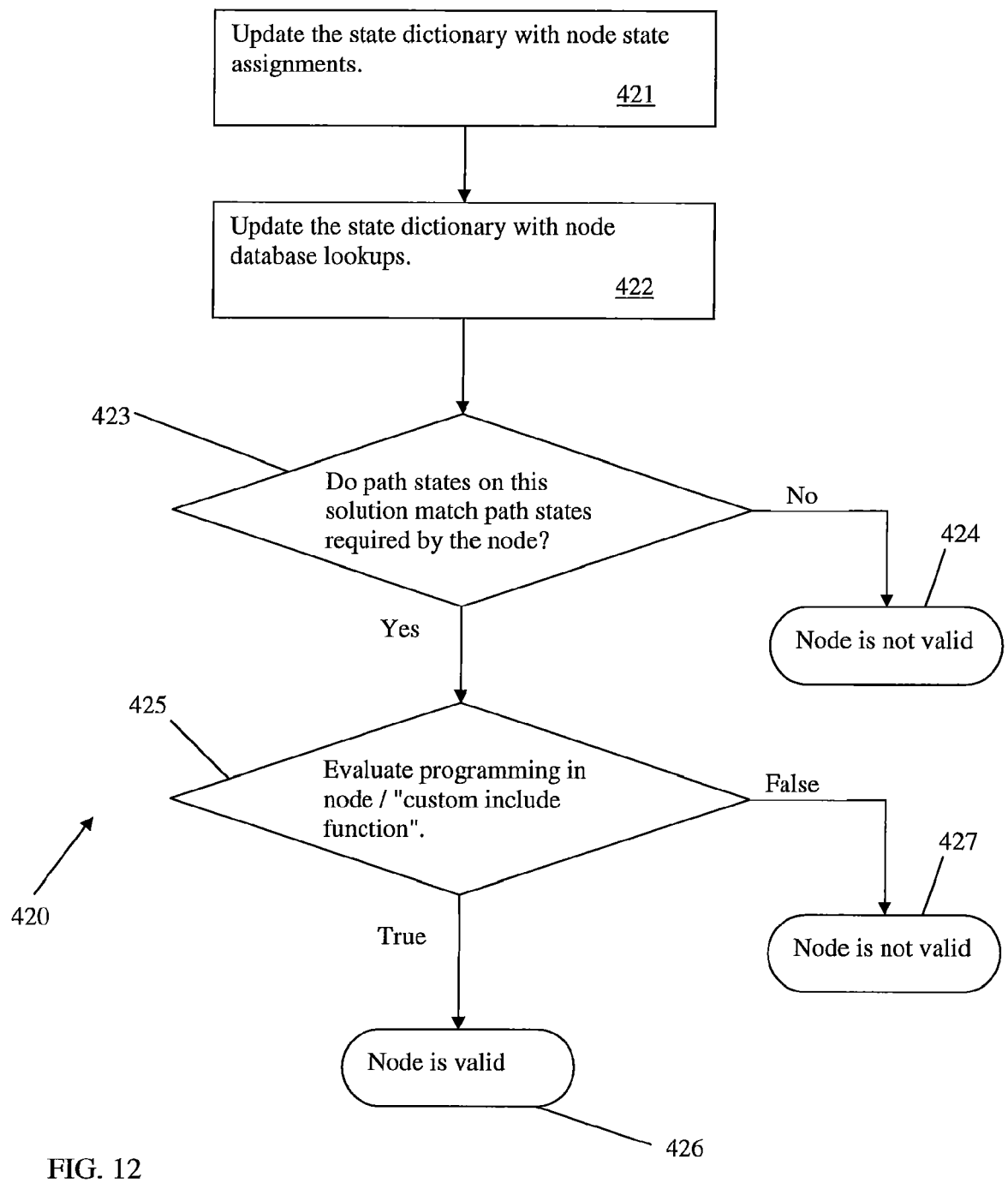
FIG. 12 is a flow chart for executing a node and determining whether the node is valid.

As shown in FIG. 12 and as discussed above, the process of executing a Possibility Tree 400 includes a process of determining whether a node is valid and executing the node 420. In this process 420, any updates of the path state dictionary with any node state assignments (such as the selection of an option and assigning it as the state of a variable) at step 421. Additionally, the state dictionary is updated with any node database lookups at step 422. At step 423, a check is then made to determine whether the path states for this branch solution match the path states required by the node. Where they do not match, the node is marked as invalid at step 424, and further nodes on the branch are deactivated. Where the path states for the branch match the path states required for the node, the full, substantive programming of the node is run, possibly including programming as in the Check Parameters node 15 above. This "custom include function" is evaluated at step 425. Where this evaluation returns "False", the node is marked as invalid at step 427. However, where this evaluation returns "True", the node is considering valid at step 426.

By way of example, in the exemplary smoothing Possibility Tree discussed above, the branch medium→strawberry→protein will now be discussed in accordance with the methods described in FIGS. 11 and 12 above. It is noted that, in reality, this branch would be computed after the medium→strawberry→no-protein branch, and therefore would be "rolled back" from medium→strawberry→no-protein to medium→strawberry→supplement, such that only the "protein" option would need to be newly selected. However, for the purposes of this example, the medium→strawberry→protein branch will be discussed as if the branch were executed wholly from the beginning.

The initial gate of the tree is the root AND gate which links all of the subsequent gates into a single tree. No action is taken on this node until step 475, at which point the queue is prepended with the four children nodes of the root AND gate—Scenario Parameters and Cosntraints node 20, and three OR gates 11. The first substantive node is the Scenario Parameters and Constraints node 20. The state dictionary is initialized and this node is put in a queue at step 405. As the queue is not empty at step 410, the node is popped from the front of the queue at step 415. At step 420, the validity of the node and its execution are performed. Specifically, at step 421, the state dictionary is updated with the node assignments, and its state is shown as FIG. 13A. Step 422 is skipped because there are no database lookups in this node 20. As there are as yet no options selections made, step 423 and 425 do not result in a cessation of the branch. Therefore, at step 426 the node 20 is deemed valid having been executed, and thus at step 430, the process moves ahead to step 435, where the state and queue are cached and the node 20 is appended to the current solution list 415 of the solver module 210, though there is no option added to the solution by this node 20. At step 440, the solver module 210 computes whether this node 20 completes a solution. However, as there are still child nodes for this node 20, and there is no programming specific to a completed solution in this tree, it is determined that this is not a solution and the process proceeds to step 455, where again there has been no solution and the node was valid, so the method proceeds to step 470. However, this node 20 is a terminal node and has no options, and so there are no "next alternatives." At step 475, the queue is prepended with the node 20 solution, which in this case does not include adding an option to the branch solution, and the method proceeds back to step 410. The solver module 210 then proceeds to And gate 11, the only child 232 listed for node 20

The next two nodes, AND gate 11 and OR gate 12 have no substantive programming, and therefore will not be discussed in detail as their function is primarily structural. Once the process comes to the size option 13 selection, the "medium" node 13 is selected for the purposes of this example. Thus, medium node 13 is popped from the front of the queue at step 415, and the solver module 210 then computes if the node 13 is valid. At step 421, the state dictionary is updated with the node assignments, and at this point appears as shown in FIG. 13B with the addition of the "cost" and "size" variables and their states. Again, no database lookups are made at step 422. At steps 423 and 425, no further programming remains due to the variable assignments having been executed above, and the node does not violate any parameters. Thus, node 13 is considered valid at step 426. At step 430 the node 13 is valid and at step 435 the node 13 is appended to the solution list 215 and the state dictionary 220 and queue are cached. At step 440, it is computed that no solution is completed, as there are remaining nodes in the queue, and the method advances to step 455. Again, as the node is valid and no solution has been found, the method advances to step 475, where no prepending is done because the medium size node 13 is a terminal node. At step 475, the node solution (medium) is prepended to the queue, and the process returns to step 410.

Next, the Check Parameters node 15 runs through essentially the same process as the Scenario Parameters and Constraints node 20 and the "medium" node 13. In the node validity check and execution step 420, the Check Parameters node 15 returns "true" because the path state variables do not fall outside the parameters (i.e., "cost" is less than "available money"). As this node 15 adds nothing to the branch solution, the process advances to the next node. Again, the next two nodes, AND gate 11 and OR gate 16 have no substantive programming, and therefore will not be discussed in detail. The flavor option 16 selection and the "strawberry" node 16 proceeds as did the medium node 13 above, with only the "flavor" variable being added to the state dictionary, as shown in FIG. 13C. At step 475, the node solution (strawberry) is prepended to the queue, and the process returns to step 410. The second Check Parameters node 15 then proceeds as did the first. Once more, the next two nodes, AND gate 11 and OR gate 18 have no substantive programming, and therefore will not be discussed in detail.

The process then advances to the supplement option 19 selection, where the "protein" node 19 is selected for the purposes of this example. Thus, protein node 19 is popped from the front of the queue at step 415, and the solver module 210 then computes if the node 19 is valid. At step 421, the state dictionary is updated with the node's variable assignments/modifications, which now appears as shown in FIG. 13D with the addition of the "supplement" variable and its state, along with the increase in the state of the "cost" variable from $3 to $4. Again, no database lookups are made at step 422. At steps 423 and 425, no further programming remains due to the variable assignments having been executed above, and the node does not violate any requirements set by the node because there are none—by design, the determination of whether each added option results in a valid partial/complete solution occurs in a subsequent node in this tree. Thus, node 19 is considered valid at step 426. At step 430 the node 19 is valid and at step 435 the node 19 is appended to the solution list 215 and the state dictionary 220 and queue are cached. At step 440, it is computed that no solution is completed, as there are remaining nodes in the queue, and the method advances to step 455. Again, as the node 19 is valid and no solution has been found, the method advances to step 470, where no next options is selected because the protein node 19 is a terminal node. At step 475, the node solution (protein) is prepended to the queue, and the process returns to step 410.

At this point, the process advances to Check Parameters node 21. Check Parameters node 21 is popped from the front of the queue at step 415, and the solver module 210 then computes if the node 21 is valid. At step 421, there are no state dictionary assignments, and there are no database lookups are made at step 422. At step 423, there are no non-programmed pre-required path states for this node. At step 425, the programming of the node compares the state of the "available money" parameter (3.75) with the state of the "cost" variable (4), and a "false" is returned, thus marking the entire branch as an invalid branch. Were there any remaining nodes in the queue, such nodes would be ignored. Thus, at step 425, the node is considered invalid 427. Thus, the process advances to step 455, where the node has been labeled invalid. At step 460, the solution, current node, path state and queue are rolled back to before the last OR gate with at least one remaining option. As the supplement OR gate 18 has no more remaining options (protein node 19 was the second and last of the options for supplement OR gate 18), the branch is rolled back to flavor OR gate 16, where the "blueberry" 17 and "banana" 17 options remain. Thus, the state dictionary appears as in FIG. 13B and the solution is rolled back from "medium→strawberry→protein" to merely "medium→flavor". As there is a valid rollback at step 465, the next flavor option 17 is prepared for execution, and at step 475, the last valid node solution (medium) is prepended to the queue, and the process returns to step 410.

Had the node been valid at step 430, it is noted that the solution would have been complete and yielded at step 450. In that case, the same rollback would still have occurred. Once there are no more rollbacks 460 and all solutions have been yielded at step 450, the valid solutions are aggregated and preferably output and/or displayed to a user.

While particular elements, embodiments, and applications of the present invention have been shown and described, it is understood that the invention is not limited thereto because modifications may be made by those skilled in the art, particularly in light of the foregoing teachings. It is therefore contemplated by the appended claims to cover such modifications and incorporate those features which come within the spirit and scope of the invention.

I claim:

1. A method of possibility tree analysis, the method comprising:
   constructing a possibility tree having a plurality of nodes, wherein at least one said node being programmable, and populating said at least a programmable node with at least a variable;
   programming at least a said programmable node with instructions for utilizing said at least a variable during the execution of said possibility tree;
   solving said possibility tree, where said solving is performed by a solver module executed by a processor element, and where said solving includes:
      tracking a path state dictionary of variables specific to a path of said possibility tree along said path, where a said programmable node creates and adds a variable to said path state dictionary, and modifies a state of an existing said variable in said path state dictionary,
      comparing at least a said variable to a user defined condition as instructed within the programming of a said programmable node,
      disabling remaining nodes of said path during the execution of said path and marking said path as an invalid solution when a said variable of said path meets a user defined condition,
   repeating said tracking, comparing and disabling steps for a plurality of paths, and aggregating and displaying completed paths as valid tree solutions,
   wherein the construction of the possibility tree includes creating and placing nodes within the possibility tree, said creating and placing including the steps of:
   creating a gate information module containing instructions for executing a node, said instructions including programming;
   creating at least two context information modules, where each context information module contains information defining the location within the possibility tree of a respective node;
   associating the at least two context information modules with the gate information module, thereby creating at least two replicant nodes.

2. The method of claim 1 wherein said populating of said at least a programmable node includes programming said programmable node with database lookups, accessing a database according to said database lookups, and importing at least a said variable according to said database lookups for use in the possibility tree.

3. The method of claim 1 where, upon reaching the conclusion of a path, the possibility tree is rolled back to its state as of its last OR gate node with an unused option, allowing the execution of said possibility tree to continue with the selection of the unused option.

* * * * *

UNITED STATES PATENT AND TRADEMARK OFFICE
CERTIFICATE OF CORRECTION

PATENT NO. : 8,412,708 B2  Page 1 of 1
APPLICATION NO. : 12/561729
DATED : April 2, 2013
INVENTOR(S) : Daniel Wolf Shevitz It is certified that error appears in the above-identified patent and that said Letters Patent is hereby corrected as shown below:

In the Specifications:

Col. 13, line 38, delete "Cosntraints" and replace with -- Constraints --

Signed and Sealed this
Sixteenth Day of July, 2013

Teresa Stanek Rea
*Acting Director of the United States Patent and Trademark Office*